(12) United States Patent  
Warren

(10) Patent No.: US 6,611,751 B2
(45) Date of Patent: Aug. 26, 2003

(54) METHOD AND APPARATUS FOR PROVIDING LOCATION BASED DATA SERVICES

(75) Inventor: David Warren, Calgary (CA)

(73) Assignee: 981455 Alberta Ltd., Calgary ( * ) Notice: Subject to any disclaimer, the term of this patent is extended or adjusted under 35 U.S.C. 154(b) by 0 days.

(21) Appl. No.: 09/814,754

(22) Filed: Mar. 23, 2001

(65) Prior Publication Data

US 2002/0143462 A1 Oct. 3, 2002

(51) Int. Cl.[7] .............................................. G01C 21/00
(52) U.S. Cl. ....................................... 701/200; 701/214
(58) Field of Search ................................ 701/200, 207, 701/208, 214; 340/988, 990, 995; 342/357.09, 357.12, 450

(56) References Cited

U.S. PATENT DOCUMENTS

| | | | |
|---|---|---|---|
| 4,870,576 A | 9/1989 | Tornetta | 364/401 |
| 4,974,170 A | 11/1990 | Bouve et al. | 364/518 |
| 5,032,989 A | 7/1991 | Tornetta | 364/401 |
| 5,179,652 A | 1/1993 | Rozmanith et al. | 395/155 |
| 5,185,857 A | 2/1993 | Rozmanith et al. | 395/148 |
| 5,283,731 A | 2/1994 | Lalonde et al. | 364/401 |
| 5,295,261 A | 3/1994 | Simonetti | 395/600 |
| 5,325,297 A | 6/1994 | Bird et al. | 364/419.07 |
| 5,335,323 A | 8/1994 | Kolnick | 395/164 |

(List continued on next page.)

FOREIGN PATENT DOCUMENTS

| | | |
|---|---|---|
| WO | WO 00/23862 | 10/1999 |
| WO | WO 00/25508 | 10/1999 |
| WO | WO 00/31667 | 11/1999 |

*Primary Examiner*—Yonel Beaulieu
(74) *Attorney, Agent, or Firm*—Gowling Lafleur Henderson LLP

(57) ABSTRACT

A method and system for providing location based data services. The present invention relates generally to a method and system for generating, storing, manipulating and displaying location-based data and more particularly relates to a method and system for using a unique identifier of spatial location to enable a database to become "location smart". The unique identifier comprises an identifier of location such as latitude and longitude as well as one other item of data such as a time-stamp or a sequence number. The unique identifier is used as a key in a database system and can be used to facilitate spatial analysis of data or to provide geographic context to data. The present invention also provides systems and methods that operate in mobile and wireless environments. The present invention allows end users to perform the functions of geographic information systems without having to provide sensitive data to GIS service providers or having to learn to use sophisticated GIS systems.

64 Claims, 15 Drawing Sheets

U.S. PATENT DOCUMENTS

| | | | |
|---|---|---|---|
| 5,371,845 A | 12/1994 | Newell et al. | 395/155 |
| 5,428,546 A | 6/1995 | Shah et al. | 364/449 |
| 5,504,482 A | 4/1996 | Schreder | 340/995 |
| 5,543,789 A | 8/1996 | Behr et al. | 340/995 |
| 5,559,707 A | 9/1996 | DeLorme et al. | 364/443 |
| 5,613,055 A | 3/1997 | Shimoura et al. | 395/173 |
| 5,646,629 A | 7/1997 | Loomis et al. | 342/357 |
| 5,682,525 A | 10/1997 | Bouve et al. | 395/615 |
| 5,712,712 A | 1/1998 | Sayward | 358/403 |
| 5,737,533 A | 4/1998 | de Hond | 395/200.49 |
| 5,758,313 A | 5/1998 | Shah et al. | 701/208 |
| 5,765,123 A | 6/1998 | Nimura et al. | 701/208 |
| 5,771,280 A | 6/1998 | Johnson | 379/93.23 |
| 5,784,059 A | 7/1998 | Morimoto et al. | 345/353 |
| 5,796,634 A | 8/1998 | Craport et al. | 364/559 |
| 5,797,112 A | 8/1998 | Komatsu et al. | 701/201 |
| 5,802,492 A | 9/1998 | DeLorme et al. | 701/200 |
| 5,805,810 A | 9/1998 | Maxwell | 395/200.36 |
| 5,808,566 A | 9/1998 | Behr et al. | 340/995 |
| 5,845,227 A | 12/1998 | Peterson | 701/209 |
| 5,848,373 A * | 12/1998 | DeLorme et al. | 701/200 |
| 5,852,810 A | 12/1998 | Sotiroff et al. | 705/27 |
| 5,867,110 A | 2/1999 | Naito et al. | 340/995 |
| 5,893,093 A | 4/1999 | Wills | 707/5 |
| 5,944,769 A | 8/1999 | Musk et al. | 701/201 |
| 5,946,687 A | 8/1999 | Gehani et al. | 707/10 |
| 5,961,572 A | 10/1999 | Craport et al. | 701/207 |
| 5,966,135 A | 10/1999 | Roy et al. | 345/433 |
| 5,978,747 A | 11/1999 | Craport et al. | 702/150 |
| 5,978,769 A | 11/1999 | Brown et al. | 705/4 |
| 5,988,853 A | 11/1999 | Kim et al. | 364/400 |
| 6,021,180 A | 2/2000 | Kass | 379/88.01 |
| 6,023,654 A | 2/2000 | Mohlenkamp | 701/208 |
| 6,073,076 A | 6/2000 | Crowley et al. | 701/208 |
| 6,081,609 A | 6/2000 | Narioka | 382/113 |
| 6,085,177 A | 7/2000 | Semple et al. | 705/43 |
| 6,092,076 A | 7/2000 | McDonough et al. | 707/102 |
| 6,098,065 A | 8/2000 | Skillen et al. | 707/3 |
| 6,101,496 A | 8/2000 | Esposito | 707/6 |
| 6,119,066 A | 9/2000 | Sugiura et al. | 701/208 |
| 6,148,289 A | 11/2000 | Virdy | 705/1 |
| 6,208,297 B1 * | 3/2001 | Fattouche et al. | 342/450 |

* cited by examiner

METHOD AND APPARATUS FOR PROVIDING LOCATION BASED DATA SERVICES

FIELD OF THE INVENTION

The present invention relates generally to a method and system for generating, storing, manipulating and displaying location-based data and more particularly relates to a method and system for using a unique identifier of spatial location for to enable a database to become "location smart".

BACKGROUND OF THE INVENTION

Geographic Information systems or GIS systems have traditionally been used to generate and manipulate images and other geographic information. One common application of such systems is to allow users to build and generate maps. In general, a map is a collection of objects displayed simultaneously on a viewing device or on media such as paper. Maps and GIS systems are particularly important where the people, places, things or activities that the map or GIS system describes must be understood in a geographic context. Many commercial users have found GIS systems to be particularly relevant to their needs. These commercial users include telecommunications service providers, who often have to design, build and maintain complex networks of equipment where knowledge of the physical location of the equipment is critical to efficient and effective network management.

Although the physical location of objects in GIS systems is often very important, existing systems do very little to allow users to understand the physical or abstract location of objects in a context that is easily understood by an end user and to easily manipulate and interact with the locational information relating to those objects. An example of an abstract location would be a street address. This is because in current computer-based GIS systems the objects are not inherently "location-smart." Location, especially abstract location, may be attribute of such objects. However, in present systems absolute physical or abstract location is not an object itself, which limits user's ability to understand, use and manipulate location based information. Often the map that is displayed is merely a passive GIF (graphical interface format) file and conducting any spatial or location based analysis of objects within the map is complex and cumbersome.

Other computer based systems, including data bases, are also significantly limited in the way location based information is handled. A business may have many disparate data bases that all use or store locational information in slightly different ways. For example, a telecommunications service provider may have slightly different ways to refer to (i) the billing address of a residential customer; (ii) the service address; (iii) addresses associated with orders for products or services or removals or changes to existing services; (iv) directory addresses, legal land or municipal survey addresses; and, (v) the location of equipment such as telephone jacks. Also, the systems way capture addresses in different formats. Often information relating to these matters is captured in distinct and incompatible databases. In many organizations there may be dozens of such disparate collections of data. It would be useful to these businesses to be able to combine these disparate collections of data based on the physical location of the subject matter.

Most commercial GIS systems are poorly equipped to help remedy these problems. As stated earlier, the maps they produce do not have "location-smart" objects. The GIS systems use complex and proprietary data structures and it is often difficult and expensive for end users to integrate their disparate data collections with the information and functionality provided by the GIS systems. There is a strong need in the current marketplace for relatively unsophisticated users or those without an extensive background in GIS systems to be able to incorporate location-based information in their applications, link disparate data collections on the basis of physical and or abstract location and to display and manipulate maps or other graphical presentations that incorporate their location-based data, or perform spatial analysis on the location based data.

These problems with handling location-based information also extend to the Internet and other communications networks such as intranets, and networks of wireless devices and personal digital assistants or PDA's. Thirty years ago the Internet was a network comprised of four nodes that were all physically located in the United States. Today, the Internet is a global network of networks consisting of approximately three billion pages of computerized on-line information that are connected by millions of geographically dispersed nodes. The explosive growth of data available on the Internet has created a problem for those, such as Internet shoppers and Internet merchants, seeking to exploit it. The problem is that all this information remains largely unorganised in a geographic context. One of the only universal ways to navigate the web is through the use of "key" word searching. Internet index sites, such as Yahoo™ have created databases that have cross-referenced keywords to specific Internet addresses. An Internet user, searching for information on a given topic, would enter search terms consisting of key words relevant to the given topic and the index would return a list of Internet sites or pages that matched the search criteria. However, key word searching is not adequate for location specific searching (e.g., an Internet user searching for wares or services that are available with a specified geographic area or a merchant who operates a web site and wishes to advertise not only the wares or services available, but also the geographic availability of these wares or services). There is also a need for Internet users to be able to publish location and time sensitive information easily on the Internet or any other searchable networks.

To establish location requires that the geographic information (e.g., address, postal code, latitude-longitude co-ordinate) be associated with a geographic reference system. This is a complex process requiring specialized technology and map data that is beyond the means of the average mass market consumer or merchant. Existing solutions to these problems include the creation of on-line directories or local, city or regional portals, many of which use third party mapping services to cross reference web-site contents to simple on-line maps. However, these existing solutions have thus far proved inadequate. These solutions are not universal; only content within the portal or directory can be used and only for pre-defined geographic areas. Further, the contents of these portals is often incomplete or not current. A third problem is that the maps generated are not interactive; Internet users often cannot plot their own data on a map and then perform a spatial operation or analysis on the map. An example of a spatial operation is determining the distance between two specified points. A fourth problem is that these solutions are often expensive and may be prohibitively expensive for small or occasional users. A fifth problem is that end users do not often want to provide their proprietary and sensitive data to a GIS service provider. They often want to link their proprietary data to a GIS in a non-intrusive manner. End users would like to perform spatial analysis on their sensitive data without having to disclose their data to the GIS service provider.

SUMMARY OF THE INVENTION

The present invention relates generally to a method and system for generating, storing, manipulating and displaying location-based data and more particularly relates to a method and system for using a unique identifier of spatial location, a unique key, for to enable a database to become "location smart".

It is an object of the present invention to provide a novel method and system for using a unique key or index of spatial location for generating, storing, manipulating and displaying location-smart data. The unique key also enables spatial analysis. A unique key can be located at the computer network user's computer, location database server or anywhere else on the Internet. By being able to interact with the unique key or index, the computer network user can conduct sophisticated GIS functionality without having to acquire a high level of expertise in GIS systems. An added benefit or advantage provided by the present invention is that it allows linking or combining disparate collections of data based on the location of objects of interest within the data collections.

A location database server receives an indication of location from a computer network user. The location database server then determines a latitude-longitude value corresponding to the received indication of location. Following this, at least one other piece of data in addition to the latitude-longitude value is generated. This one other piece of data serves to allow for more than one unique key to be generated for any given latitude-longitude coordinate. The determined latitude-longitude value and the at least one other piece of data are then combined to form a unique key.

A computer network user, wishing to conduct a location sensitive search, generates a location sensitive search request and submits it to a location database server. The location database server receives a location sensitive search request having a location information component from a computer network user. It then parses the location information component into a format that is used by a location database. Once this is done, the location database is queried with the parsed location information component for records that satisfy the location sensitive search request. Search results from the location database that satisfy the location sensitive search request are then generated and transmitted the search results. The computer network user receives a search result from the location database server, and displays the search results.

In another embodiment of the invention a location sensitive search request is sent from a static location as a point of reference. A computer network user generates a location sensitive search request and an indication of a static location that acts as a reference point for the location sensitive search request. This information is then submitted to a location database server. The location database server receives an indication of the location of a static reference point and a location sensitive search request. A latitude-longitude value corresponding to the received indication of location of the static reference point is then determined. In addition, at least one other piece of data in addition to the latitude-longitude value is generated. The determined latitude-longitude value and the at least one other piece of data are then combined to form a unique key. Once this is done, the location database is queried with the parsed location information component for records that satisfy the location sensitive search request. Search results from the location database that satisfy the location sensitive search request are then generated and transmitted the search results. The computer network user receives a search result from the location database server; and displays the search results.

In another embodiment of the invention a location sensitive search request is sent from a mobile location of a wireless device as a point of reference. A computer network user generates a location sensitive search request and positioning information of the wireless device. The location sensitive search request and the positioning information of the wireless device are then submitted to a location database server. The location database server receives positioning information and a location sensitive search request. A nearest static location that corresponds to the positioning information is then determined. Following this step, a latitude-longitude value corresponding to the nearest address is determined. In addition, at least one other piece of data in addition to the latitude-longitude value is generated. The determined latitude-longitude value and the at least one other piece of data are then combined to form a unique key. Once this is done, the location database is queried with the parsed location information component for records that satisfy the location sensitive search request. Search results from the location database that satisfy the location sensitive search request are then generated and transmitted the search results. The computer network user receives a search result from the location database server; and displays the search results.

In another embodiment of the invention a location sensitive search request is sent from a device for which a unique key, which acts as a reference point for the search, has been assigned already. A computer network user generates a location sensitive search request and a unique key to a location database server. The location database server receives a unique key and a location sensitive search request. The location database is then queried, with the unique key as a reference point, for records that satisfy the location sensitive search request. Search results from the location database that satisfy the location sensitive search request are then generated and transmitted the search results. The computer network user receives a search result from the location database server, and displays the search results.

A computer network user, wishing to create location sensitive data and transmit it to a location database server, first generates information relating to at least one of an item, a service, an event of interest or an instance of location sensitive information. An indication of location for the at least one of an item, a service, an event of interest or an instance of location sensitive information is then generated. Following this the information and the indication of location is transmitted to a database server. A computer network server receives the location sensitive data relating to at least one of an item, a service, an event of interest or an instance of location sensitive data and the indication of the location of said location sensitive data. The indication of location is parsed into a format used by a location database to determine if a unique key may be generated for the parsed indication of location. If a unique key for this indication of location exists already, the location database server combines it with the location sensitive date and creates a database entry comprising the combined unique key and the location sensitive data. If a unique key for this indication of location does not exist, the location database server determines a latitude-longitude value corresponding to the received indication of location. Following this, at least one other piece of data in addition to the latitude-longitude value is generated.

This one other piece of data serves to allow for more than one unique key to be generated for any given latitude-longitude coordinate. The determined latitude-longitude value and the at least one other piece of data are then combined to form a unique key. The location database server then combines the unique key with the location sensitive date and creates a database entry comprising the combined unique key and the location sensitive data.

In another embodiment of the invention a computer network user wishing to create location sensitive data that is stored in a location other than a location database server. A computer network user generates information relating to at least one of an item, a service, an event of interest or an instance of location sensitive information and an indication of location for the at least one of an item, a service, an event of interest or an instance of location sensitive information. The indication of location is then transmitted to a location database. The computer network user receives response from the location database server, where the response comprises a unique key that corresponds to the submitted indication of location. The unique key is then associated with the location sensitive data and a database entry comprising the associated unique key and the location sensitive data is created.

A computer network server receives the location sensitive data relating to at least one of an item, a service, an event of interest or an instance of location sensitive data and the indication of the location of said location sensitive data. The indication of location is parsed into a format used by a location database to determine if a unique key may be generated for the parsed indication of location. If a unique key for this indication of location exists already, the location database server combines it with the location sensitive date and creates a database entry comprising the combined unique key and the location sensitive data. If a unique key for this indication of location does not exist, the location database server determines a latitude-longitude value corresponding to the received indication of location. Following this, at least one other piece of data in addition to the latitude-longitude value is generated. This one other piece of data serves to allow for more than one unique key to be generated for any given latitude-longitude coordinate. The determined latitude-longitude value and the at least one other piece of data are then combined to form a unique key. The location database server then combines the unique key with the location sensitive date and creates a database entry comprising the combined unique key and the location sensitive data.

BRIEF DESCRIPTION OF THE DRAWINGS

The present invention will now be explained, by way of example only, with reference to certain embodiments and the attached Figures in which.

DETAILED DESCRIPTION OF THE INVENTION

Prior Art View of a GIS

Figure 1:
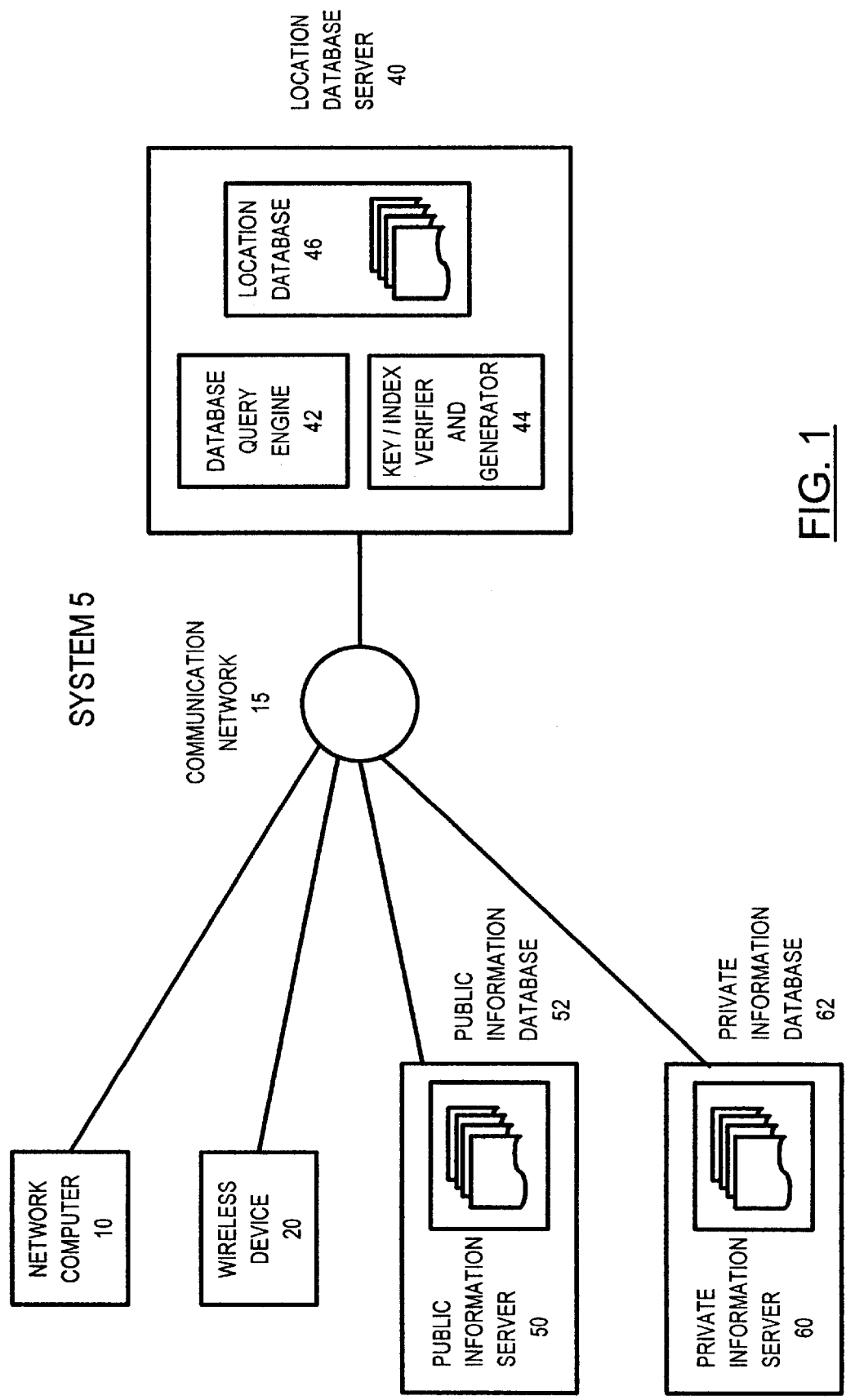
FIG. 1 is a schematic diagram of a computer system in accordance with an embodiment of the present invention.

A GIS is a database management system or merely a collection of files or structures operated upon by external application programs. In the prior art it consists of tables of attributes for a particular geographic location, all linked together by a unique key or index. The unique key or index acts solely to uniquely identify a record within the database. It has no other function nor is any additional information provided by the primary key. It is the basis by which information about a particular geographic location that is located in separate tables may be cross referenced. The attributes associated with a unique key or index may include geographic location, such as a latitude longitude coordinate, feature type, such as a building, a hill or a lake, as well as the dimensions of the given feature.

The present invention represents two advances over the prior art. The first advance is that the unique key or index in the present invention not only specifies or identifies a given record and allows information on different tables to be cross-referenced, but it also contains additional information regarding location or geographic context, such as latitude and longitude and at least one other piece of additional data, such as a time record. This key is known to those skilled in the art as an "intelligent" key. This advance functions to both identify uniquely a particular geographic location and also provide further information about the particular geographic location, such as relative position, and as such obviates the need to return to the database tables for this additional information.

A second advance over the prior art is that the present invention treats as objects what were previously considered as attributes of a given feature that includes a geographic location, such as address, name and location. To this end, the preferred embodiment employs a hybrid object-relational database model. The tables are indexed using the previously defined unique key or index. In the prior art, attributes of an object were saved in separate tables. In the present invention, the attributes and methods of a data-type are not separated. An individual may execute a method of an object in a database by simply referring to it. Those skilled in the art will realize that this can be done using an object database. It should be noted that it would be very difficult to implement this as a purely relational database. This would require the use of triggers in tables and stored procedures separate from the tables.

Definition of a Unique Key and a Location Database

Location database 46 is an object-relational hybrid database, for example Oracle 8i as sold by the Oracle Corporation of Redwood City, Calif. The database is comprised of data-types that support address, geometry and location. As such, further data-types or tables using these data-types can be stored and manipulated. Each addressable location in the database is identified by a unique key or index, which is not necessarily a primary key as it is understood to those skilled in the art. The unique key or index contains a latitude and longitude coordinate. In the preferred embodiment of the present invention, the coordinate is specified in the WGS84, internationally recognised global coordinate system, as developed by the National Imagery and Mapping Agency (NIMA) Bethesda, Md., which is hereby incorporated by reference.

Figure 2:
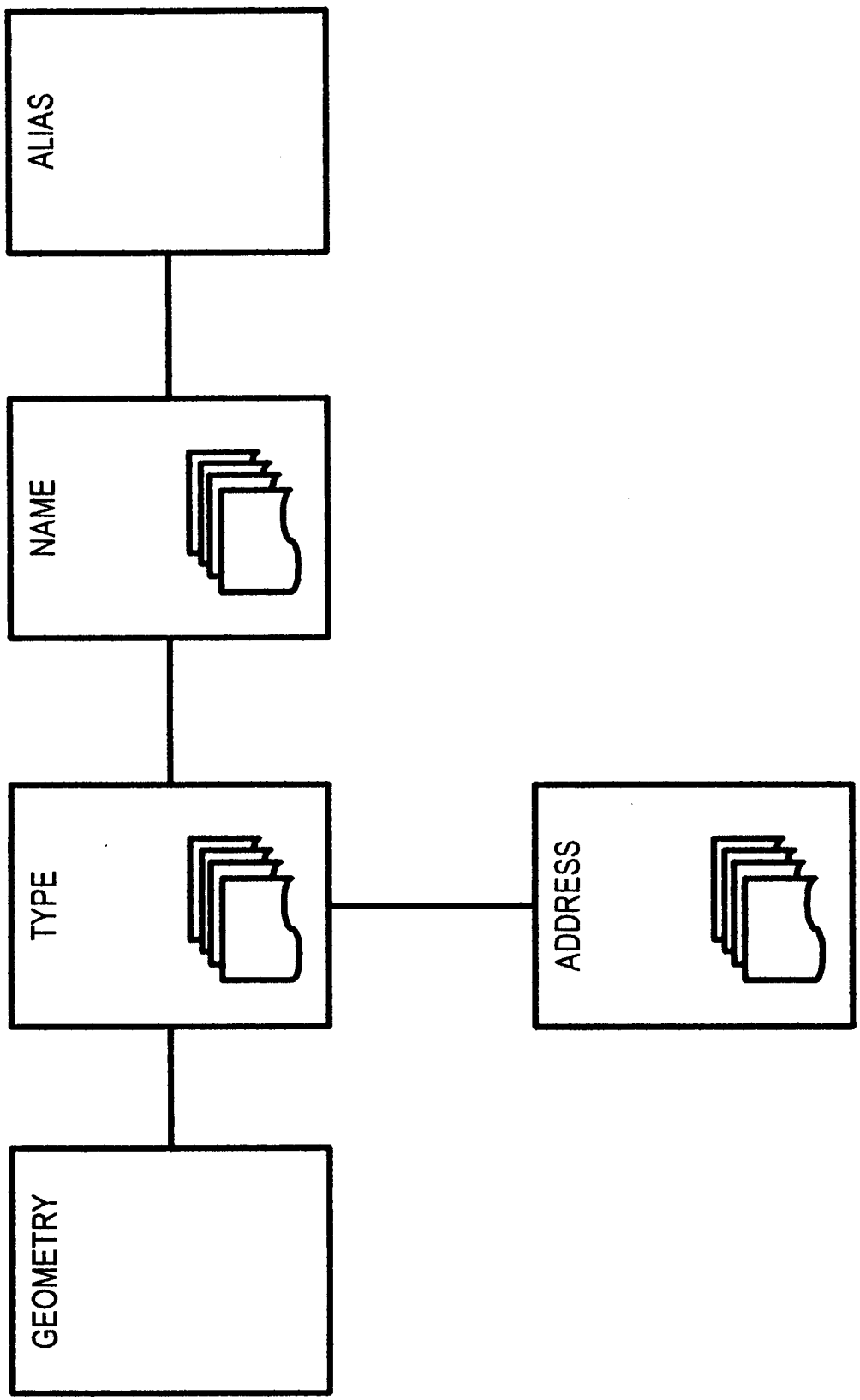
FIG. 2 is a schematic diagram of a data structure in accordance with an embodiment of the present invention.

The unique key or index contains at least one other element of data that allows for the identification of more than one thing at any given addressable location. In the preferred embodiment of the present invention, the unique key or index also contains a time record, which specifies the time that the unique key or index was created, and a sequence number, which creates another point of distinction at the two-dimensional latitude-longitude coordinate. It will be apparent to those skilled in the art that any combination of a piece of data that acts as a unique geographic identifier and at least one other piece of data that permits for more than one record for any given addressable location maybe used as a unique key or index. The unique key or index indexes other data-types that describe an addressable location in the preferred embodiment of the invention, each addressable location or user defined location is parsed into the following data-types, as set out in FIG. 2;

1. its geometry, which is the Open GIS Consortium, Inc. OpenGIS® Simple Features Specification For SQL (revision 1.1), Open GIS Project Document 99-049. Release Date: May 5, 1999), which is hereby incorporated by reference. For example, a point, line or polygon may be a simple feature;
2. Its type location, which is a hierarchy of objects that describe real world things, such as the boundary of a country, state, province or city and a roadway segment;
3. Its name, which is similar hierarchy of objects that refer to real world things, such as Canada, Alberta, Calgary. Related to the names is a list of Aliases by which a given name is known, such as CA, AB, CGY. The list of names is not hierarchical and can be thought of as an attribute of a given name; and,
4. Its address, which is a hierarchy that corresponds very closely to the component location and can be considered as being made up of a component location hierarchy, such as Suite 300-555 Ave SW, Calgary, Alta, Canada.

A User Creating Location Sensitive Data

A person using a computer network, operates network computer 10 that consists of a RAM, ROM, a display (not shown) and programmable media upon which computer readable code may be generated, transmitted, recorded, manipulated or stored as a memory (not shown), for example, of the type sold by IBM® of Armonk, N.Y., logs on to a computer network system 5. The person could also interact with the computer network by way of wireless device 20, such as a mobile phone or PDA. He or she could also use an Internet appliance, which is any device that interacts with the Internet. In the preferred embodiment of the invention, the computer network system 5 is the Internet. However, as will be apparent to those skilled in the art computer network system 5 could be any computer network consisting of at least two computers, such as a local area network, a wide area network, an intranet or a virtual private network. The computer network user creates or compiles information relating to wares, services, events or other objects that are available or located within a specified geographic area or have some relevant geographic context. This information can include content, such as a name, narrative description of the thing, other text, graphics, hyperlinks to web pages or other content, instructions to start a computer application or any other information of potential interest. The computer network user submits the information along with an indication of its location, such as a civic address, via communication network 15 to a location database server 40. Alternately, the computer network user submits only an indication of location. Communication network 15 may consist of data transmission lines, routers and servers as are known to those skilled in the art.

Location database server 40 is a computer network server that consists of a RAM, ROM, display, etc. (not shown) and programmable media upon which computer readable code maybe generated, transmitted, recorded, manipulated or stored as a memory (not shown), for example, of the type sold by IBM® of Armonk, N.Y. Location database server 40 also contains a data base query engine 42, a location data base 46, such as the object-relational hybrid database described above, and a key/index verifier and generator 44. The key/index verifier and generator 44 includes a transition network parser, of the sort described in Luger, G. F. and Stubblefield, W. A., "Artificial Intelligence, Structures and Strategies for Complex Problem Solving", 2nd Edition, The Benjamin/Cummings Publishing Company, Inc., 1993, pp. 403–407, as is known to those skilled in the art. The key/index verifier and generator 44 receives the indication of location, such as street address, and parses it into its constituent parts and organises it into a format that is used by the location database 46. The key/index verifier and generator 44 then submits the parsed indication of location to the location database 46 to determine if it is an indication of location for which a unique key or index entry may be generated and returned.

If the parsed indication of location provided by the computer network user is identified as a valid indication of location and a unique key or index entry has been created already for this valid addressable location, then the unique key or index entry and associated content are incorporated into the location database 46 and made available and accessible to those computer network users searching for information relating to wares, services, events, or other objects of interest that are available within a specified geographic area.

If the parsed indication of location provided by the computer network user is identified as a valid addressable location and a unique key or index entry has not been created for this valid addressable location, then the key/index verifier and generator generates a unique key or index entry, as described above, for this valid addressable location. This can be done in two ways. First, the latitude-longitude for this addressable location could be obtained from some other database. Alternatively, if the latitude-longitude values are known for at least two nearby addressable locations, the latitude-longitude of this addressable location could be determined by interpolation. The unique key or index entry and the associated content are then incorporated into the location database 46 and made available and accessible to those computer network users searching for information relating to wares, services, events, or other objects of interest that are available within the specified geographic area.

If the parsed indication of location provided by the computer network user is not identified as a valid addressable location, the key/index verifier and generator 44 returns an error message to network computer 10 via communication network 15, informing the computer network user that the location information provided does not correspond to a valid addressable location. In an alternate embodiment of the invention, the key/index verifier and generator 44 may send suggestions to network computer 10 via network communication 15 outlining steps that the computer network user may take to correct the error. In a further alternate embodiment, the key/index verifier and generator may generate a list of possible valid addressable locations based on the information provided and send this list to network computer 10 via communication network 15. In response, the computer network user may select the correct address from the list provided, or submit further location information to the key/index verifier and generator 44.

In an alternate embodiment, the computer network user may not wish to have the unique key or index and associated content registered with the location database 46. The computer network user may use the unique key or index to tag or associate with the data that he or she intends to make publicly available. In the preferred embodiment, the unique key or index is incorporated in to the meta data of a web page and is available as a search target for computer network users searching for this sort of geographically specific data. In this embodiment, location sensitive data is tagged or associated with the unique, but it does not have to be stored on a location database server. The combined location sensitive data and unique key may be stored in any database that supports this data-type.

In a further alternate embodiment, the computer network user may use the unique key or index to tag or associate with data that is not publicly available, access to which is restricted to authorised computer network users/individuals. The unique key or index can then be used to enable spatial analysis of the computer network user's data. However, the spatial analysis function done within the location database server 46 itself. GIS functionality doesn't reside in computer network user's database. In an alternate embodiment, a location database and GIS functionality resides on computer network user's computer. The computer network user provides at least one unique key and a location sensitive search request to the location database server 46 via network communication 15.

A Computer Network User Searching for Location Sensitive Data

The unique key enables spatial analysis. A unique key can be located at the computer network user's computer, location database server 46 or anywhere else on the Internet. By being able to interact with the unique key or index, the computer network user can conduct sophisticated GIS functionality such as spatial analysis without having to acquire a high level of expertise in GIS systems and without having to export sensitive and proprietary data to a GIS provider.

A person using a computer network, operates network computer 10 that consists of a RAM, ROM, a display (not shown) and programmable media upon which computer readable code may be generated, transmitted, recorded, manipulated or stored as a memory (not shown), for example, of the type sold by IBM® of Armonk, N.Y., logs on to a computer network system 5. The person could also interact with the computer network by way of wireless device 20, such as a mobile phone or PDA. They could also use an Internet appliance, which is any device that interacts with the Internet. In the preferred embodiment of the invention, the computer network system 5 is the Internet. However, as will be apparent to those skilled in the art computer network system 5 could be any computer network consisting of at least two computers, such as a local area network, an intranet or a virtual private network. The computer network user, searching for information relating to wares or services that are available within a specified geographic area, creates a query specifying search criteria, such as ware, service, event, delivery area and location. In an alternate embodiment of the invention, the computer network user may be searching for information relating to wares or services that are available relative to his or her present physical location.

In this case, prior to generating and submitting a location sensitive query to the location database server 40, the computer network user submits information relating to his or her present physical location to the location database server 40. If the user is in a static location, such as a house, apartment building, shopping mall, sports arena, etc., the computer network user can submit the address of this static location to the location database server 40 and in return receive the unique key or index of the address. If however, the computer network user is operating a mobile communication device, such as a mobile phone or wireless PDA, which employs a positioning technology by which the location of the wireless device 20 can be detected, and the computer network user is not located in a static location, the mobile communication device 20 can transmit the computer network user's positioning information to the location database server 40 and in return receive the unique key or index that corresponds most closely to the transmitted position information.

This location sensitive query is transmitted via communication network 15 to location database server 40. Communication network 15 may consist of data transmission lines, routers and servers as are known to those skilled in the art. Location database server 40 is a computer network server that consists of a RAM, ROM, display, etc. (not shown) and programmable media upon which computer readable code may be generated, transmitted, recorded, manipulated or stored as a memory (not shown), for example, of the type sold by IBM® of Armonk, N.Y. Location database server 40 also contains a data base query engine 42, location data base 46 and key/index verifier and generator 44. Database query engine 42 receives the computer network user's query and queries location database 46 for records that match the search criteria. The records that match the search criteria are then sent to computer 10 via communication network 15.

In an alternate embodiment of the invention, a public information database server 50 stores the unique key or index and location sensitive information in a public information database 52, access to which is open all computer network users.

In a further alternate embodiment of the invention, a private information database server 60 stores the unique key or index and location sensitive information in a private information database 62, access to which is restricted to authorised computer network users.

In the preferred embodiment of the invention, the search result is returned in the form of a visual display consisting of a map of the geographic area of interest as well as icons that represent the real world location of the records that match the user's search criteria and the category of the item that is being sought. In an alternate embodiment, the search result may be sent in a non-graphic format that satisfies the spatially related query. For example, the search result may be in the form of a text list of the abstract locations.

The size, shape, colour and other attributes of the icons are defined by the database developer. In an alternate embodiment of the invention the attributes of the icon are defined by the user searching for location specific information, the web master, the web developer, etc. . . . The user is then able to click on these icons and receive more information relating to the item that matched the search criteria. In another alternate embodiment of the invention, the icon may function as a communication link that will link the user to a web page that will provide more information about the item being sought. In a further embodiment, the user may click on the icon that in response executes a start command for a computer application.

Figure 3:
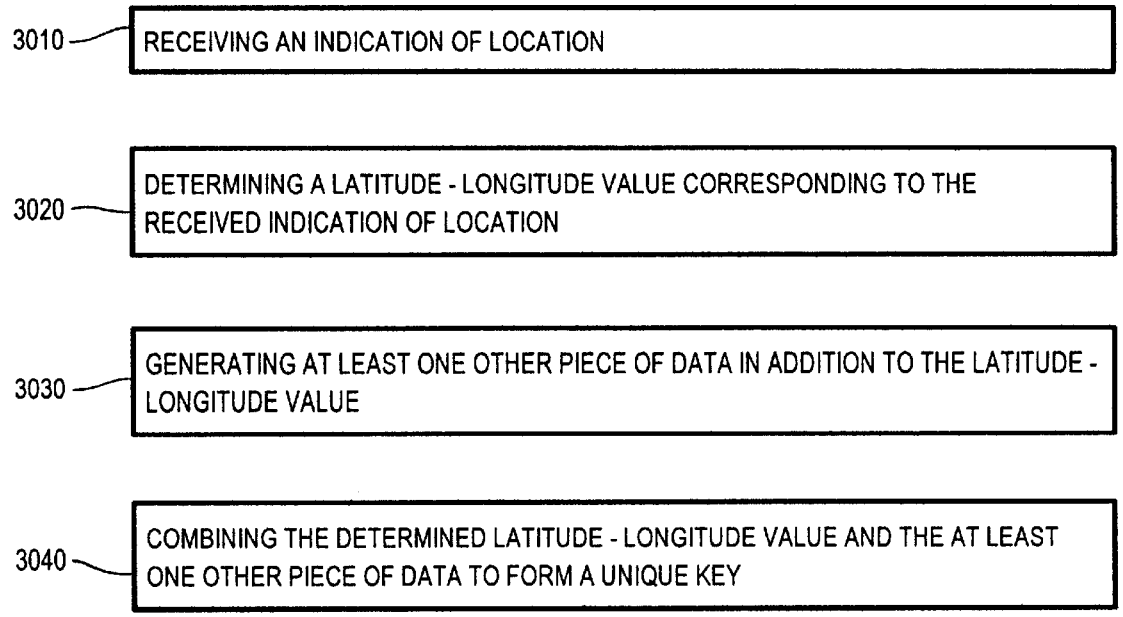
FIG. 3 is a flowchart of a method for generating a unique key in accordance with an embodiment of the present invention.

A method for generating a unique key or index will now be discussed with reference to the flowchart of FIG. 3 and system 5. In the preferred embodiment of the invention, the method described in FIG. 3 is commenced on a location database server 40 receiving an indication of location. The location database server can be enabled by a computer program product, comprising a memory having computer-readable code embodied therein for generating a unique key or index including a code means for receiving an indication of location; determining a latitude-longitude value corresponding to the received indication of location; generating at least one other piece of data in addition to the latitude-longitude value; and, combining the determined latitude-longitude value and the at least one other piece of data to form a unique key. At step 3010, this information consists, by way of example, of a civic address, such as 199 Bay St., Toronto, Ontario Canada, a geographic area, such as a city neighbourhood or any abstract location, such as an event. At step 3020 a latitude-longitude value corresponding to the received indication of location is determined. Once the latitude-longitude value is determined, then at step 3030 at least one other piece of data is generated, such as a time stamp, which is any time stamp determined at a consistent time within the steps of the method (e.g., the time that the latitude-longitude value was determined or the time that the request for the unique key was made) or a sequence number. At step 3040, the latitude-longitude and the at least one other piece of data are combined to form a single unique key or index, which is in a form that is easily understood by a computer, such as a hexadecimal format.

Figure 4:
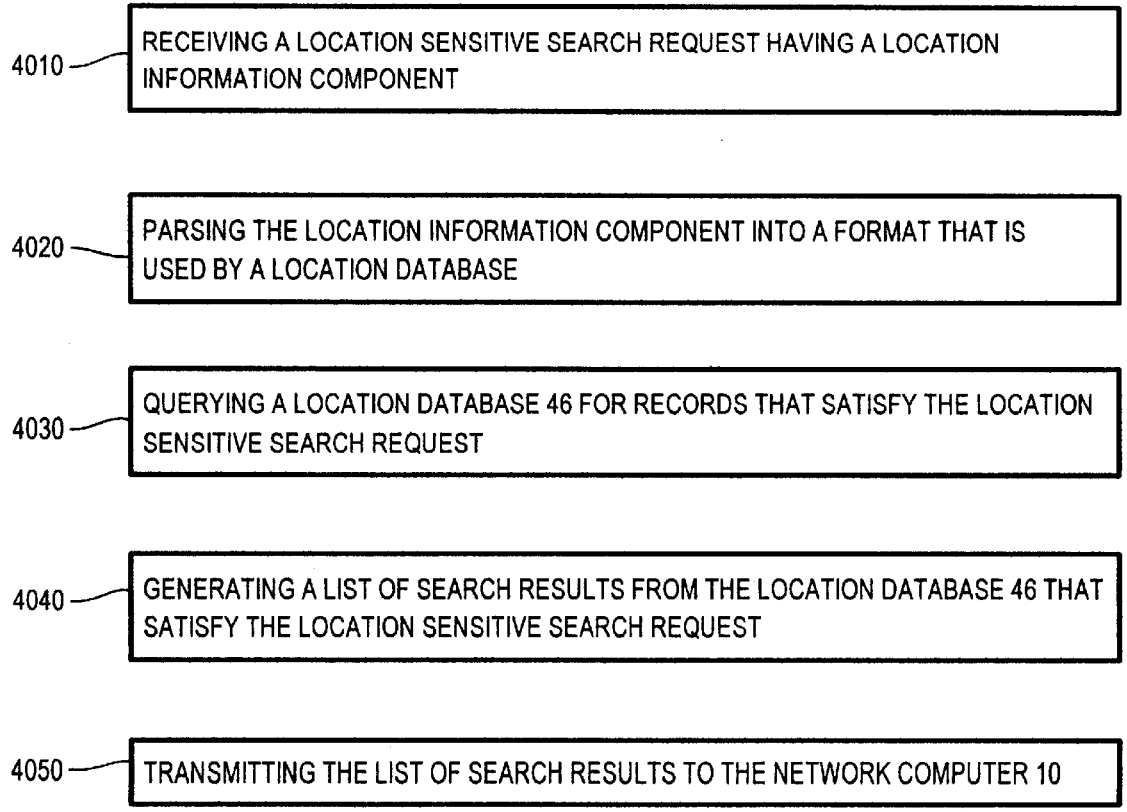
FIG. 4 is a flowchart of a method for processing a location sensitive search request for a specified geographic area in accordance with an embodiment of the present invention.

A method for searching for processing a location sensitive search request for a specified geographic area will now be discussed with reference to the flowchart of FIG. 4 and system 5. In the preferred embodiment of the invention, the method described in FIG. 4 is commenced on receiving a location sensitive search request from a network computer 10. At step 4010 this information consists of a location information component, a description of the item, service, or material of interest and a description of the geographic area of interest. The location information component of the location sensitive search is then parsed into a format that is used by a location database (step 4020). At step 4030, a database query engine queries a location database 46 for records that match the location sensitive search request. A list consisting of the search results that satisfy the location sensitive search request is then generated at step 4040 and transmitted to the network computer 10 (step 4050).

Figure 5:
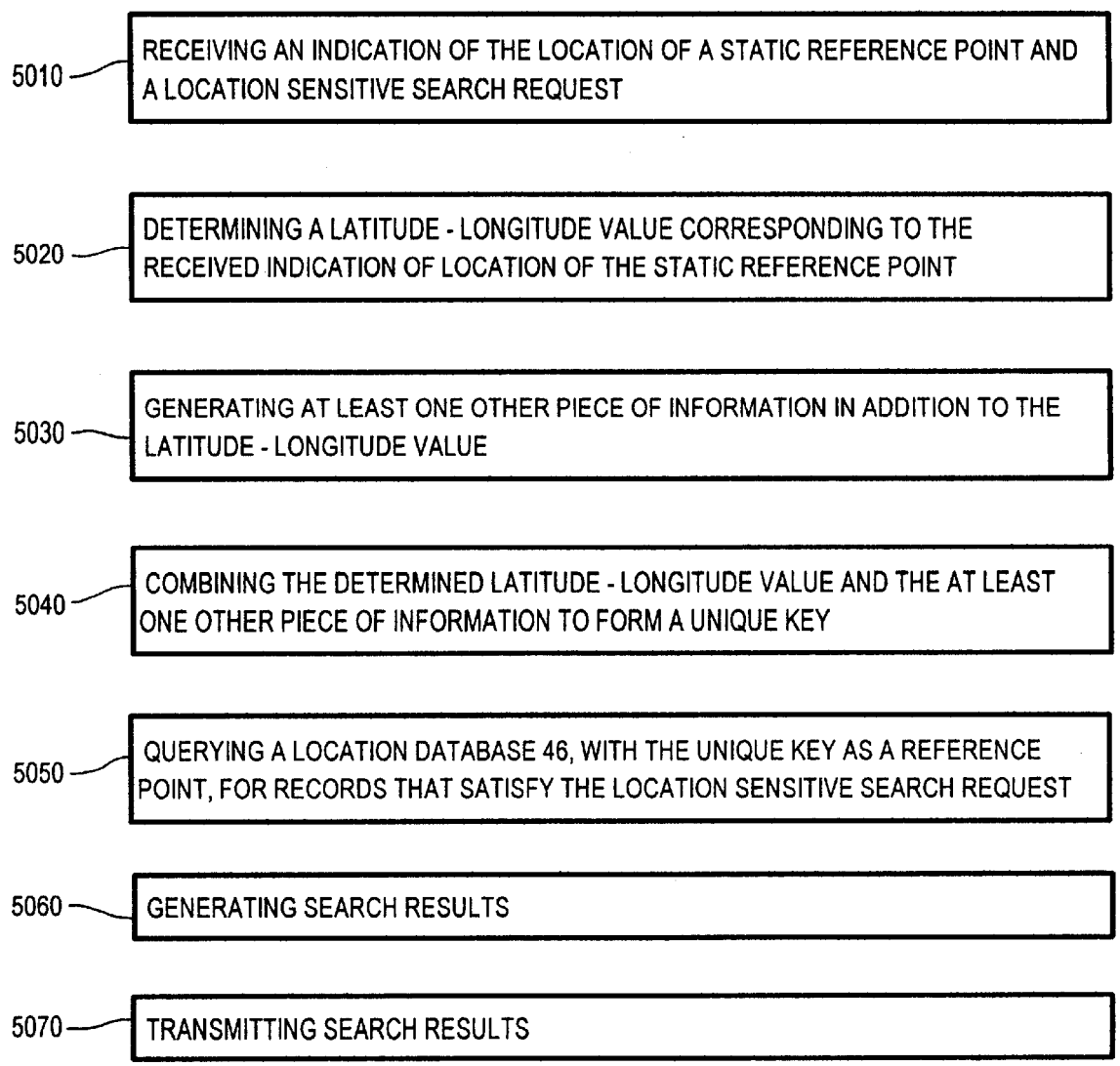
FIG. 5 is a flowchart of a method for creating a unique key and processing a location sensitive search request with a static location as a reference point in accordance with an embodiment of the present invention.

A method for creating a unique key or index and processing a location sensitive search request with a static location as a reference point will now be discussed with reference to the flowchart of FIG. 5 and system 5. In the preferred embodiment of the invention, the method described in FIG. 5 is commenced on receiving an indication of the location of a static reference point and a location sensitive search request from a network computer 10 (step 5010). At step 5020 a latitude-longitude value corresponding to the indication of location of the static reference point is determined. Once the latitude-longitude value is determined, then at step 5030 at least one other piece of data is generated, such as a time stamp, which is any time stamp determined at a consistent time within the steps of the method (e.g., the time that the latitude-longitude value was determined or the time that the request for the unique key was made) or a sequence number. At step 5040, the latitude-longitude and the at least one other piece of data are combined to form a single unique key or index, which is in a form that is easily understood by a computer, such as a hexadecimal format.

A database query engine 42 queries a location database 46, with the unique key as a reference point, for records that satisfy the location sensitive search request (step 5050). The search results that satisfy the location sensitive search request are then generated at step 5060 and at step 5070 transmitted to the network computer 10.

Figure 6:
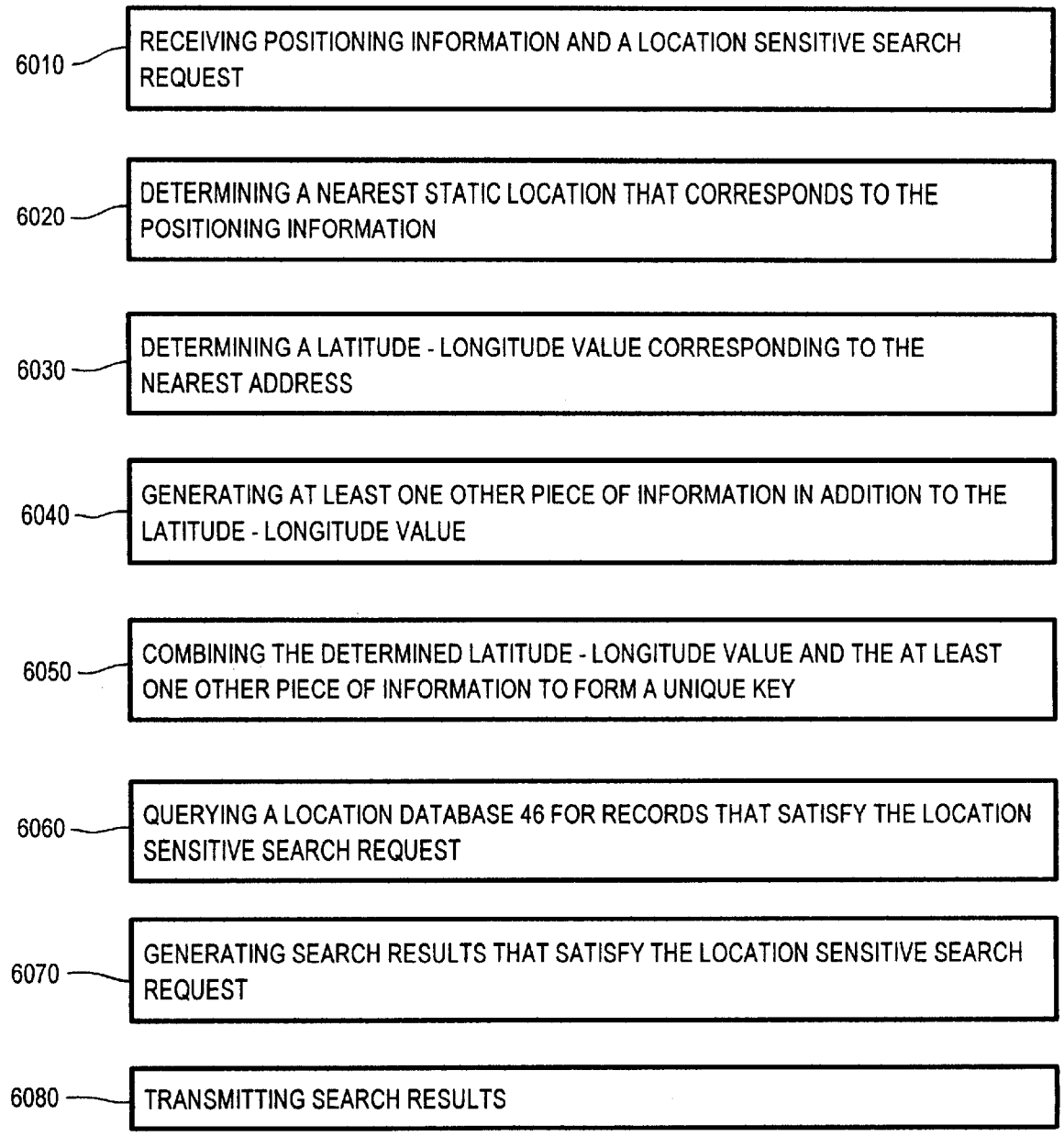
FIG. 6 is a flowchart of a method for creating a unique key and processing a location sensitive search request with a mobile location as a reference point in accordance with an embodiment of the present invention.

A method for creating a unique key or index and processing a location sensitive search request with a mobile location as a reference point will now be discussed with reference to the flowchart of FIG. 6 and system 5. In the preferred embodiment of the invention, the method described in FIG. 6 is commenced on receiving positioning information of a mobile reference point and a location sensitive search request from a wireless device 20 (step 6010). At step 6020 the nearest static location that corresponds to the position of the wireless device 20 is determined. A latitude-longitude value corresponding to the nearest static location is then determined at step 6030. Once the latitude-longitude value is determined, then at step 6040 at least one other piece of data is generated, such as a time stamp, which is any time stamp determined at a consistent time within the steps of the method (e.g., the time that the latitude-longitude value was determined or the time that the request for the unique key was made) or a sequence number. At step 6050, the latitude-longitude and the at least one other piece of data are combined to form a single unique key or index, which is in a form that is easily understood by a computer, such as a hexadecimal format.

A database query engine 42 queries a location database 46, with the unique key as a reference point, for records that satisfy the location sensitive search request (step 6060). The search results that satisfy the location sensitive search request are then generated at step 6070 and at step 6080 transmitted to the wireless device 20.

Figure 7:
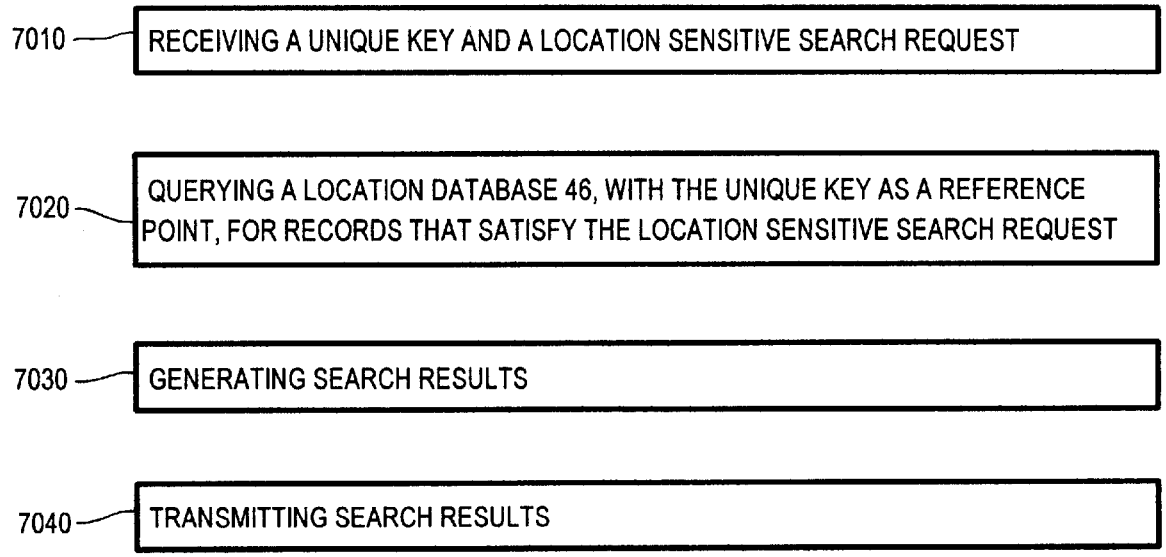
FIG. 7 is a flowchart of a method for processing a location sensitive search request from a device for which a unique key, which acts as a reference point for the search, has been assigned already in accordance with an embodiment of the present invention.

A method for processing a location sensitive search request from a device for which a unique key, which acts as a reference point for the search, has been assigned already will now be discussed with reference to the flowchart of FIG. 7 and system 5. In the preferred embodiment of the invention, the method described in FIG. 7 is commenced on receiving a unique key and a location sensitive search request from a network computer 10 (step 7010). A database query engine 42 queries a location database 46, with the unique key as a reference point, for records that satisfy the location sensitive search request (step 7020). The search results that satisfy the location sensitive search request are then generated at step 7030 and at step 7040 transmitted to the network computer 10.

Figure 8:
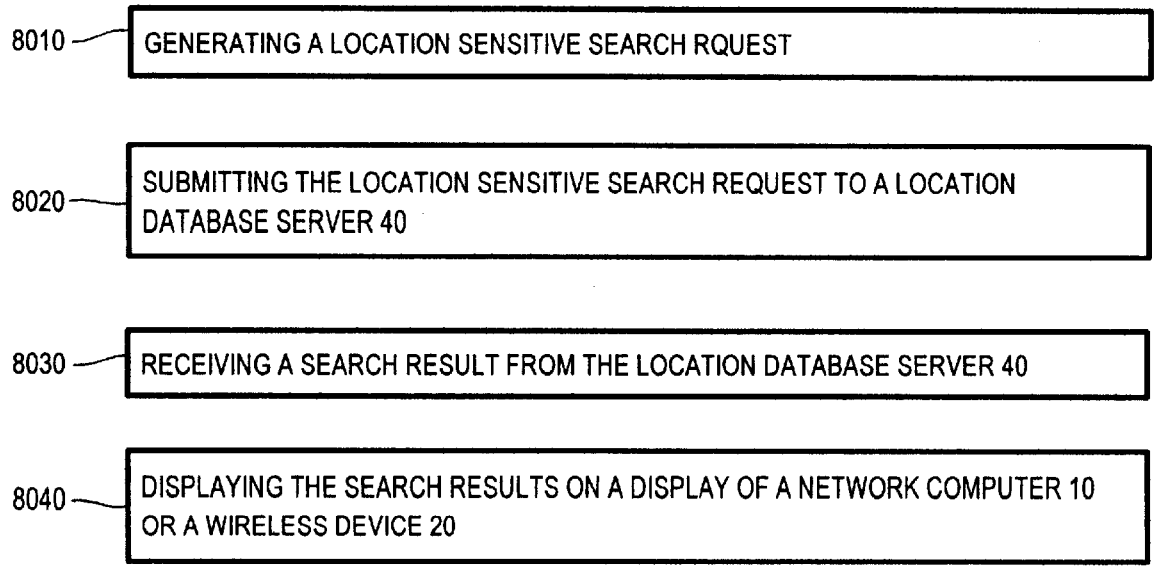
FIG. 8 is a flowchart of a method for conducting a location sensitive search in accordance with an embodiment of the present invention.

A method for conducting a location sensitive search request will now be discussed with reference to the flowchart of FIG. 8 and system 5. In the preferred embodiment of the invention, the method described in FIG. 8 is commenced on a network computer generating a location sensitive search request (step 8010). The network computer may be enabled by a computer program product, comprising a memory having computer-readable code embodied therein for conducting a location sensitive search that includes a code means for getting a location sensitive search request; submitting the location sensitive search request to a location database server; receiving a search result from the location database server; and, displaying the search result. At step 8010, the location sensitive search request consists of a description of the item, service, or material of interest and a description of the geographic area of interest or some other geographic context. The location sensitive search request is then submitted to a location database server 40 in step 8020. At step 8030, a network computer 10 or wireless 20 receives a search result from the location database server 40. The search results are displayed in a display of the network computer 10 or wireless device 20 at step 8040.

Figure 9:
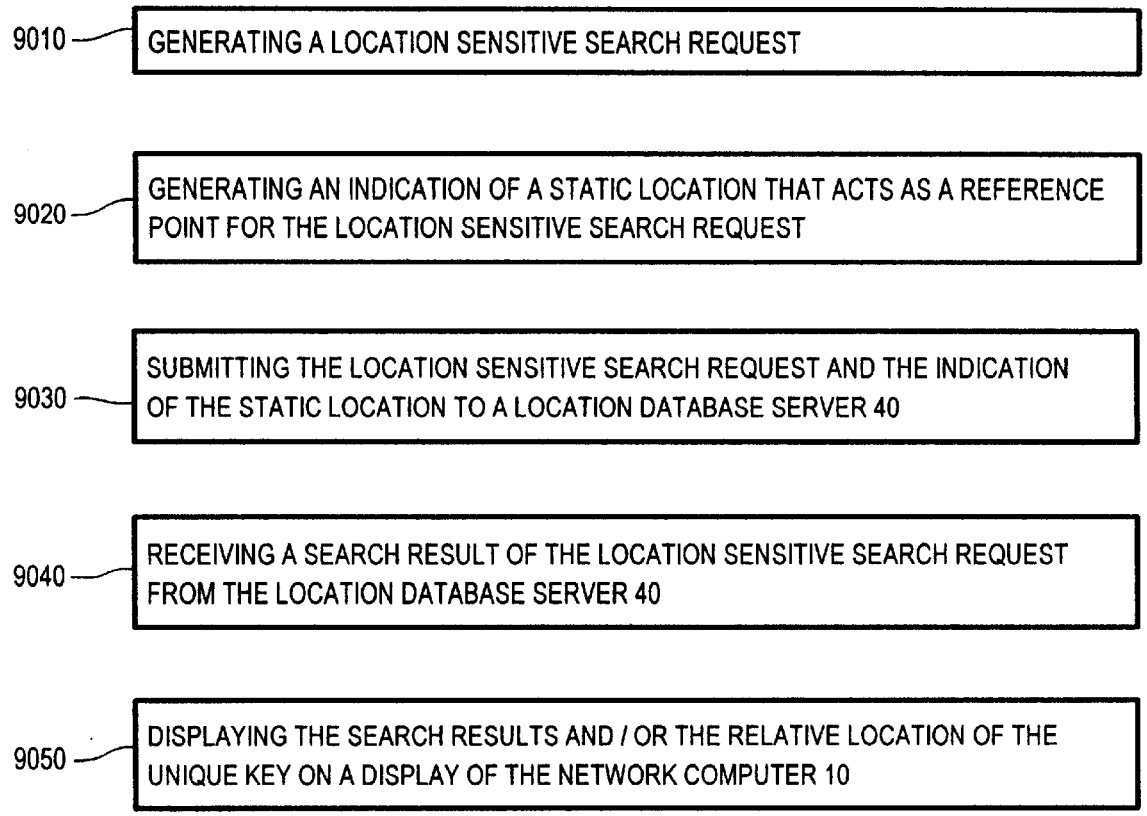
FIG. 9 is a flowchart of a method for conducting a location sensitive search from a static location as a point of reference in accordance with an embodiment of the present invention.

A method for conducting a location sensitive search with a static location as a reference point will now be discussed with reference to the flowchart of FIG. 9 and system 5. In the preferred embodiment of the invention, the method described in FIG. 9 is commenced on generating a location sensitive search (step 9010). At step 9020 an indication of the static location that acts as the reference point for the location sensitive search is generated. The location sensitive search request and the indication of static location are then submitted to a location database server 40 at step 9030. At step 9040 a network computer 10 receives a unique key or index that corresponds to the position of the indication of static location and or the search results of the location sensitive search request from location database server 40. The search results and or relative location of the unique key or index are then displayed on a display of the network computer 10 at step 9050.

Figure 10:
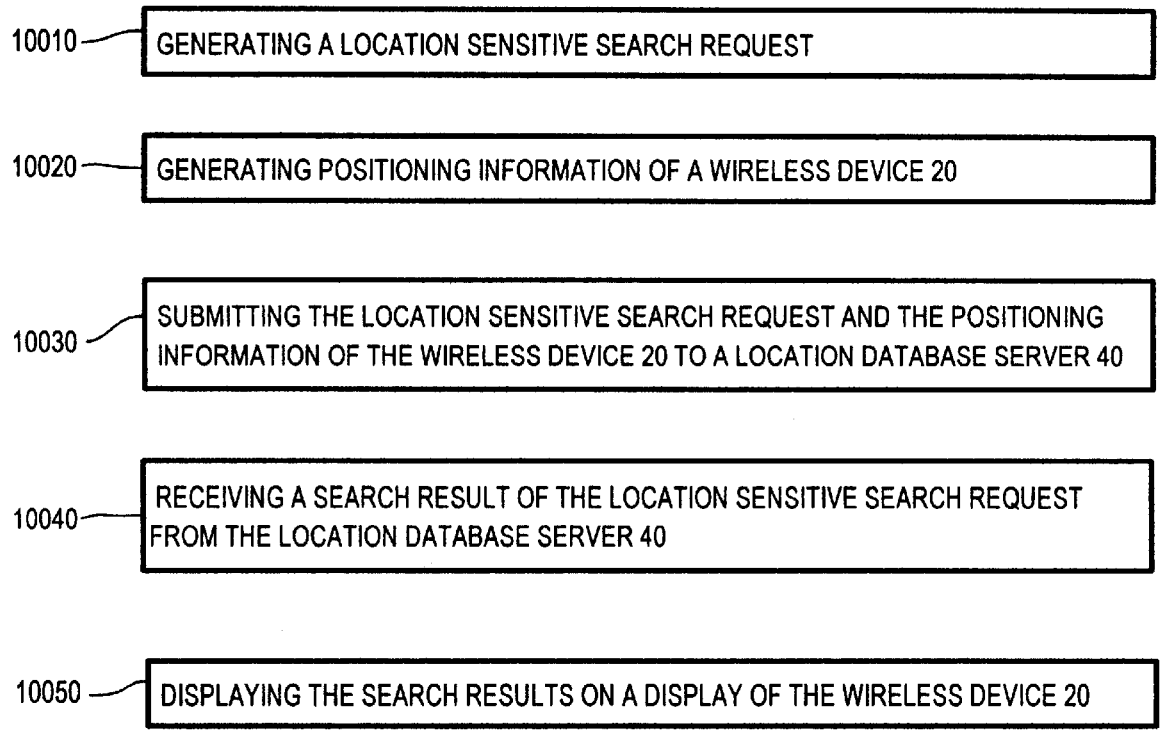
FIG. 10 is a flowchart of a method for conducting a location sensitive search from a mobile location as a point of reference in accordance with an embodiment of the present invention.

A method for conducting a location sensitive search with a mobile location as a reference point will now be discussed with reference to the flowchart of FIG. 10 and system 5. In the preferred embodiment of the invention, the method described in FIG. 10 is commenced on generating a location sensitive search request (step 10010). At step 10020 an indication of the mobile location of a wireless device 20, which acts as the reference point for the location sensitive search, is generated. The location sensitive search request and the indication of mobile location of the wireless device 20 are then submitted to a location database server 40 at step 10030. At step 10040, the wireless device 20 receives, from the location database server 40, a search result of the location sensitive search request. The search result is displayed on a display of the wireless device 20 at step 10050.

Figure 11:
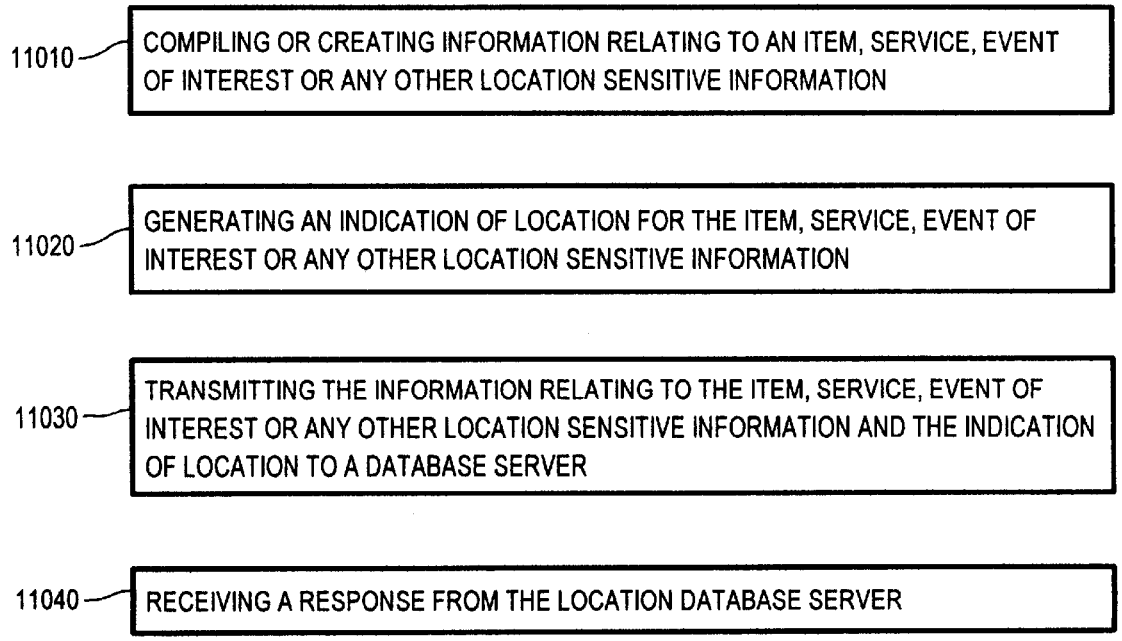
FIG. 11 is a flowchart of a method for creating location sensitive data and storing it in a location database in accordance with an embodiment of the present invention.

A method for creating location sensitive data and transmitting it to a location database server will now be discussed with reference to the flowchart of FIG. 11 and system 5. In the preferred embodiment of the invention, the method described in FIG. 11 is commenced on creating or compiling information relating to an item, service, event of interest or any other location sensitive information (step 11010). At step 11020, an indication of location for the information relating to the item, service, event of interest or any other location sensitive information is generated. Then, the indication of location and the information relating to the item, service, event of interest or any other location sensitive information is transmitted to a location database server (step 11030). At step 11040 a response is received from the location database server. The response from the location database server may be a unique key that corresponds to the submitted information relating to the item, service, event of interest or any other location sensitive information and the indication of location to a database server. Alternately, if an invalid indication of location was sent to the location database server, then the response may consist of an error message. The error message may also include suggestions for correcting the error or a list of alternative indications of locations for which a unique key may be generated.

Figure 12:
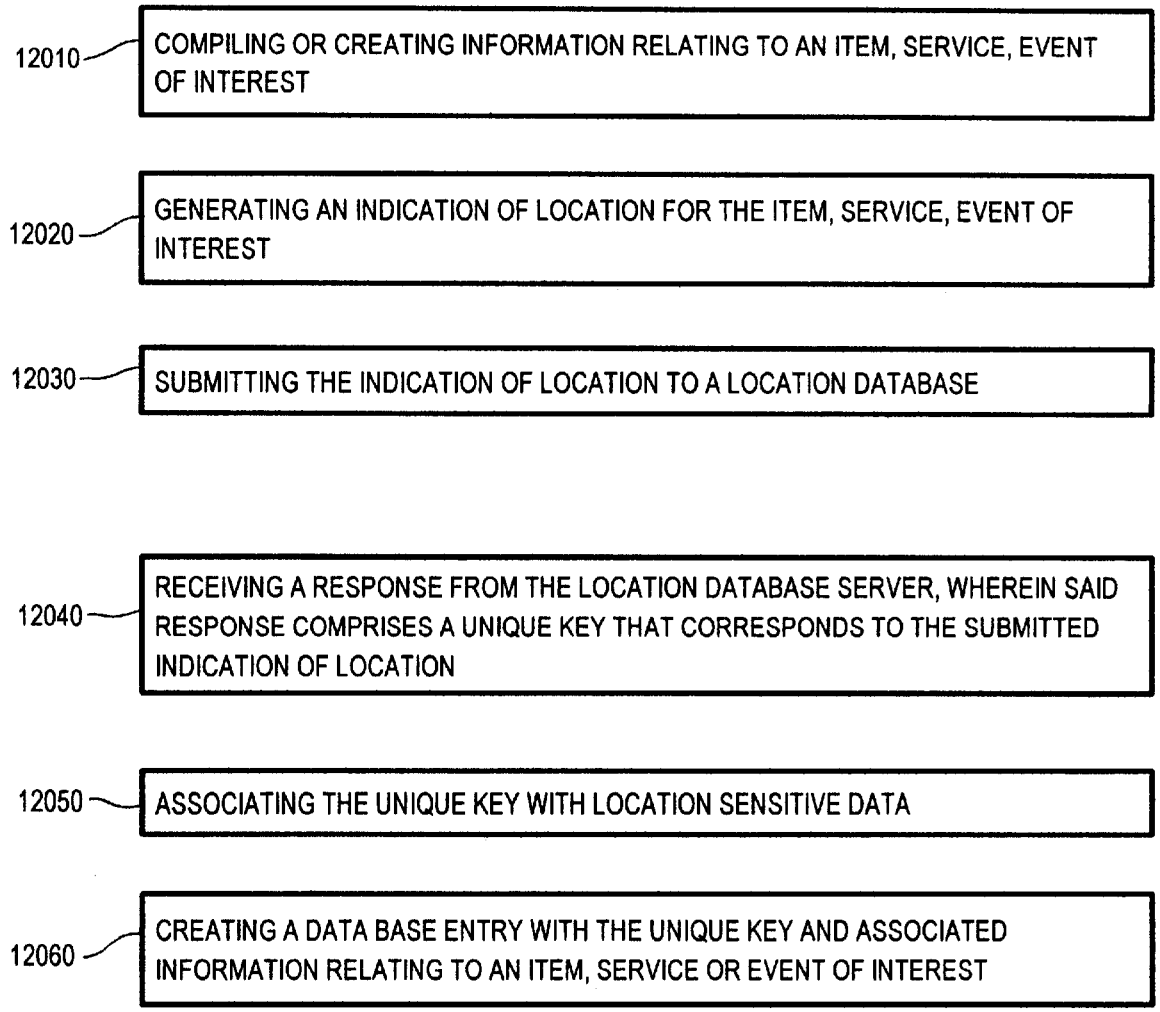
FIG. 12 is a flowchart of a method for creating location sensitive data that is stored in a location other than a location database server in accordance with an embodiment of the present invention.

A method for creating location sensitive data that is stored in a location other than a location database server will now be discussed with reference to the flowchart of FIG. 12 and system 5. In the preferred embodiment of the invention, the method described in FIG. 12 is commenced on creating or compiling information relating to an item, service, event of interest or any other location sensitive information (step 12010). At step 12020, an indication of location for the information relating to the item, service, event of interest or any other location sensitive information is generated. Then, the indication of location and the information relating to the item, service, event of interest or any other location sensitive information is transmitted to a location database server (step 12030). At step 12040 a unique key that corresponds to the submitted indication is returned. This unique key is then associated with the information relating to an item, service, event of interest or any other location sensitive information (step 12050). At step 12060, a database entry with the unique key and associated information relating to an item, service or event of interest is created.

Figure 13:
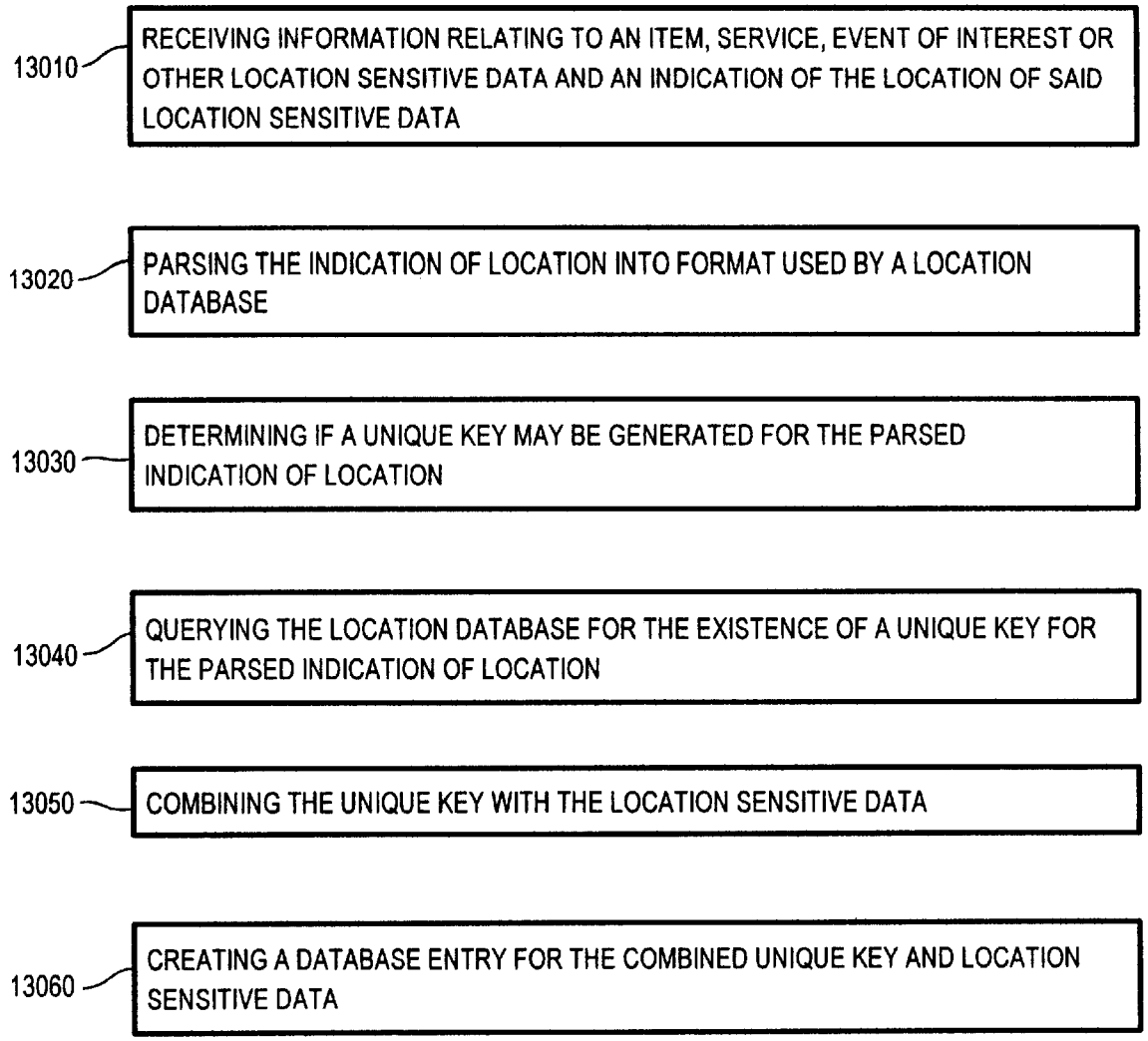
FIG. 13 is a flowchart of a method for receiving and storing location sensitive data for which a unique key exists in accordance with an embodiment of the present invention.

A method for receiving and storing location sensitive data for which a unique key exists will now be discussed with reference to the flowchart of FIG. 13 and system 5. In the preferred embodiment of the invention, the method described in FIG. 13 is commenced on receiving information relating to an item, service, event of interest or other location sensitive data and an indication of the location of said location sensitive data (step 13010). At step 13020, the indication of location is parsed into a format used by a location database. Once the indication of location is parsed, then a determination is made of whether a unique key may be generated for the parsed indication of location step 13030. At step 13040 database query engine queries the location database for the existence of a unique key for the parsed indication of location. The unique key with the location sensitive data (step 13050) and a database entry for the combined unique key and location sensitive data is created (step 13060).

Figure 14:
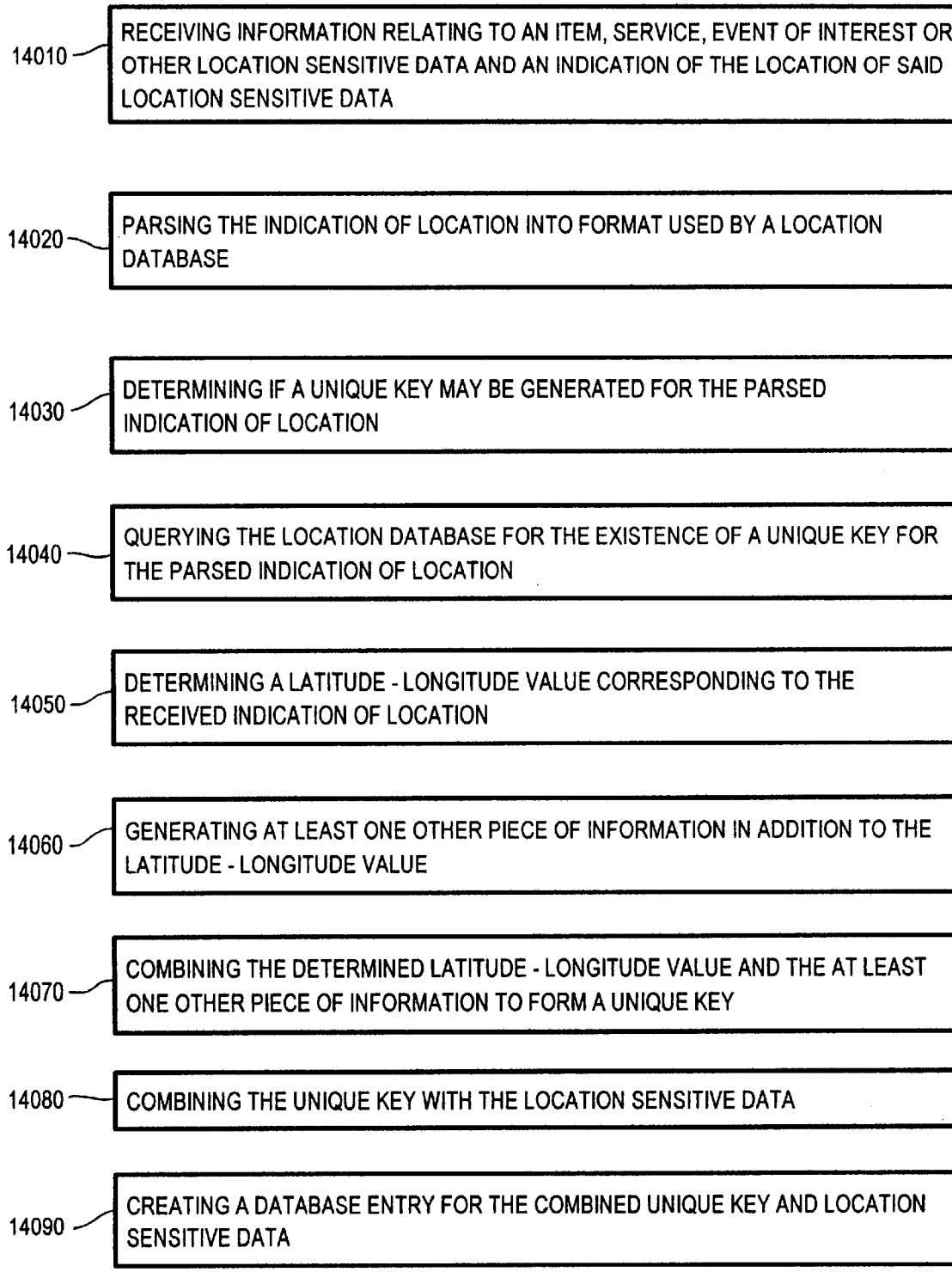
FIG. 14 is a flowchart of a method for receiving and storing location sensitive data for which a unique key does not exist in accordance with an embodiment of the present invention.

A method for receiving and storing location sensitive data for which a unique key does not exist will now be discussed with reference to the flowchart of FIG. 14 and system 5. In the preferred embodiment of the invention, the method described in FIG. 14 is commenced on receiving information relating to an item, service, event of interest or other location sensitive data and an indication of the location of said location sensitive data (step 14010). At step 14020, the indication of location is parsed into a format used by a location database. Once the indication of location is parsed, then a determination is made of whether a unique key may be generated for the parsed indication of location step 14030. At step 14040 database query engine queries the location database for the existence of a unique key for the parsed indication of location. At step 14050 a latitude-longitude value corresponding to the received indication of location is determined. Once the latitude-longitude value is determined, then at step 14060 at least one other piece of data is generated, such as a time stamp, which is any time stamp determined at a consistent time within the steps of the method (e.g., the time that the latitude-longitude value was determined or the time that the request for the unique key was made) or a sequence number. At step 14070, the latitude-longitude and the at least one other piece of data are combined to form a single unique key or index, which is in a form that is easily understood by a computer, such as a hexadecimal format. The unique key with the location sensitive data (step 14080) and a database entry for the combined unique key and location sensitive data is created (step 14090).

Figure 15:
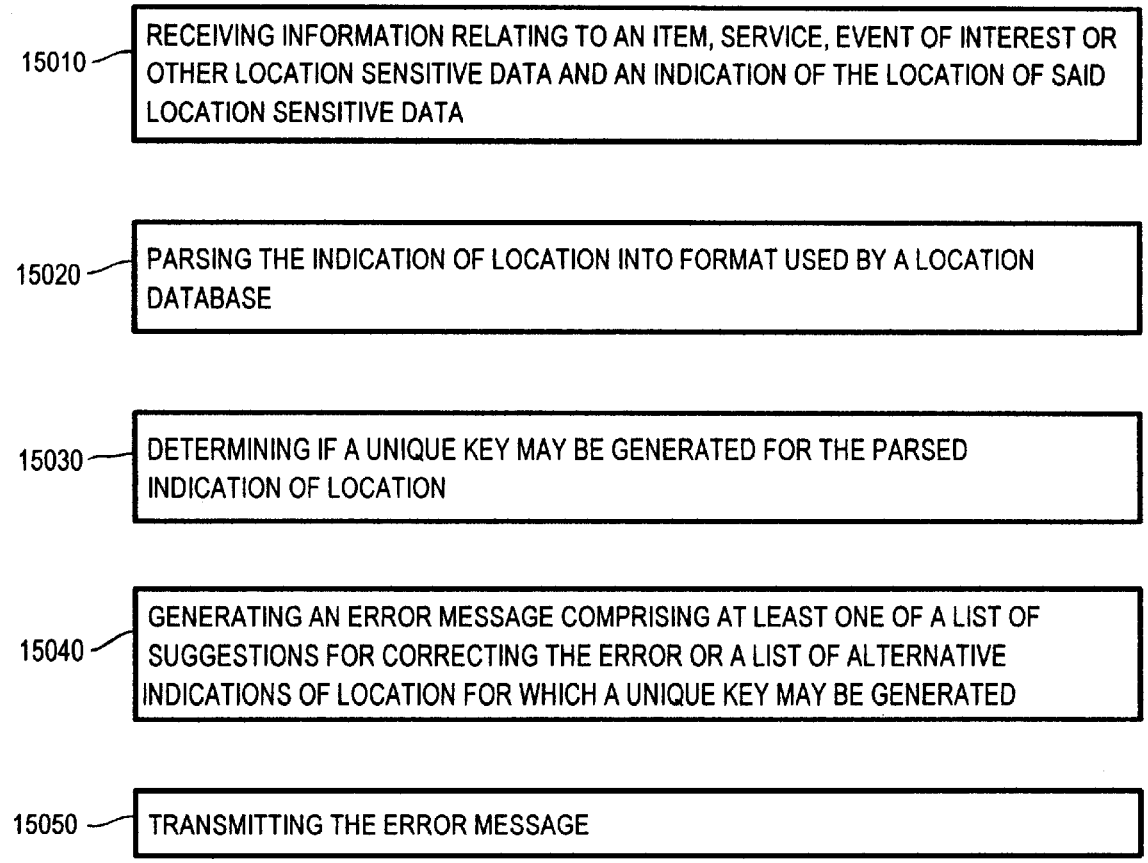
FIG. 15 is a flowchart of a method for returning an error message upon receipt of invalid indication of location in accordance with an embodiment of the present invention.

A method for returning an error message upon receipt of invalid indication of location will now be discussed with reference to the flowchart of FIG. 15 and system 5. In the preferred embodiment of the invention, the method described in FIG. 15 is commenced on receiving information relating to an item, service, event of interest or other location sensitive data and an indication of the location of said location sensitive data (step 15010). At step 15020, the indication of location is parsed into a format used by a location database. Once the indication of location is parsed, then a determination is made of whether a unique key may be generated for the parsed indication of location step 15030. At step 15040 an error message is generated, comprising at least one of a list of suggestions for correcting the error or a list of alternative indications of location for which a unique key may be generated. The error message is then transmitted to a computer network user (step 15050).

Those skilled in the art will recognize that there are many equivalent embodiments of the invention described above. The scope of the invention is defined in the claims, set out below.

I claim:

1. A method for generating a unique key comprising:
   a. receiving an indication of location:
   b. determining a latitude-longitude value corresponding to the received indication of location;
   c. generating at least one other piece of data in addition to the latitude-longitude value; and,
   d. combining the determined latitude-longitude value and the at least one other piece of data to generate the unique key.

2. The method of claim 1 wherein the indication of location is at least one of an addressable location, a geographic area, a physical location or an abstract location.

3. The method of claim 2 wherein the addressable location is civic address.

4. The method of claim 2 wherein the geographic area is at least one of a boundary of a geographic region, a street, or a building.

5. The method of claim 2 wherein the abstract location is at least one of an event, or a meeting.

6. The method of claim 1 wherein the at least one other piece of data is at least one of a time or a sequence number.

7. The method of claim 6 wherein the time is at least one of a time that the latitude-longitude determination was made, a time when the request for the unique key was received or a time determined at a consistent time within the steps of the method.

8. A system for generating a unique key for use in a database system comprising:
   a. means for receiving an indication of location;
   b. means for determining a latitude-longitude value corresponding to the received indication of location:
   c. means for generating at least one other piece of data in addition to the latitude-longitude value; and,
   d. means for combining the determined latitude-longitude value and the at least one other piece of data to generate the unique key.

9. A method for processing a location sensitive search request for a specified geographic area comprising:
   a. receiving a location sensitive search request having a location information component;
   b. parsing the location information component into a format that is used by a location database;
   c. querying the location database with the parsed location information component for records that satisfy the location sensitive search request;
   d. generating search results from the location database that satisfy the location sensitive search request; and,
   e. transmitting the search results.

10. The method of claim 9 wherein the search results are in a non-graphic format.

11. The method of claim 10 wherein the non-graphic format is a text list or table of abstract locations.

12. The method of claim 9 wherein the search results are in a graphic format.

13. The method of claim 12 wherein the graphic format is a map of the geographic area of interest.

14. The method of claim 13 wherein the map is comprised of a base map and at least one icon.

15. The method of claim 14 wherein the at least one icon represents a real world location of an instance of the search results.

16. The method of claim 14 wherein at least one of a colour or a shape of the at least one icon identifies a category of location sensitive information.

17. The method of claim 14 wherein the at least one icon is linked to further information corresponding to the search results.

18. The method of claim 17 wherein the further information corresponding to the search results comprises at least one of a text, a graphic, a link to information stored on another computer connected to the same network or instructions to execute a computer application.

19. The method of claim 17 wherein the computer network user clicks on the icon to obtain the further information corresponding to the search results.

20. A system for processing a location sensitive search request for a specified geographic area comprising:
   a. means for receiving a location sensitive search request having a location information component;

b. means for parsing the location information component into a format that is used by a location database;

c. means for querying the location database with the parsed location information component for records that satisfy the location sensitive search request;

d. means for generating search results from the location database that satisfy the location sensitive search request; and, e. means for transmitting the search results.

21. A method for generating a unique key and processing a location sensitive search request with a static location as a reference point comprising:

a. receiving an indication of the location of a static reference point and a location sensitive search request;

b. determining a latitude-longitude value corresponding to the received indication of location of the static reference point;

c. generating at least one other piece of data in addition to the latitude-longitude value;

d. combining the determined latitude-longitude value and the at least one other piece of data to generate the unique key;

e. querying a location database with the unique key as a reference point, for records that satisfy the location sensitive search request;

f. generating search results; and, g. transmitting the search results.

22. The method of claim 21 wherein the indication of location is at least one of an addressable location, a geographic area, a physical location or an abstract location.

23. The method of claim 21 wherein the at least one other piece of data is at least one of a time or a sequence number.

24. The method of claim 23 wherein the time is at least one of a time that the latitude-longitude determination was made, a time when the request for the unique key was received or a time determined at a consistent time within the steps of the method.

25. The method of claim 21 wherein the search results includes the unique key.

26. The method of claim 21 wherein the search results are in a non-graphic format.

27. The method of claim 26 wherein the non-graphic format is a text or a table of abstract locations.

28. The method of claim 21 wherein the search results are in a graphic format.

29. The method of claim 28 wherein the graphic format is a map of the geographic area of interest.

30. The method of claim 29 wherein the map is comprised of a base map and at least one icon.

31. The method of claim 30 wherein the at least one icon represents a real world location of an instance of the search result.

32. The method of claim 30 wherein at least one of a colour or a shape of the at least one icon identifies a category of location sensitive information.

33. The method of claim 30 wherein the at least one icon is linked to further information corresponding to the search results.

34. The method of claim 33 wherein the further information corresponding to the search results comprises at least one of a text, a graphic, a link to information on another computer connected to the same network or a set of instructions for a computer application.

35. The method of claim 34 wherein a computer network user clicks on the icon to obtain the further information corresponding to the search results.

36. A system for generating a unique key and processing a location sensitive search request with a static location as a reference point consisting of:

a. means for receiving an indication of the location of a static reference point and a location sensitive search request;

b. means for determining a latitude-longitude value corresponding to the received indication of location of the static reference point;

c. means for generating at least one other piece of data in addition to the latitude-longitude value;

d. means for combining the determined latitude-longitude value and the at least one other piece of data to generate the unique key;

e. means for querying a location database, with the unique key as a reference point for records that satisfy the location sensitive search request;

f. means for generating search results; and, g. means for transmitting the search results.

37. A method for generating a unique key and processing a location sensitive search request with a mobile location as a reference point comprising the steps of:

a. receiving positioning information and a location sensitive search request;

b. determining a nearest static location that corresponds to the positioning information;

c. determining a latitude-longitude value corresponding to the nearest address;

d. generating at least one other piece of data in addition to the latitude-longitude value;

e. combining the determined latitude-longitude value and the at least one other piece of data to generate the unique key;

f. querying a location database for records that satisfy the location Sensitive search request;

g. generating search results that satisfy the location sensitive search request; and, h. transmitting the search results.

38. A system for generating a unique key and processing a location sensitive search request with a mobile location as a reference point comprising:

a. means for receiving positioning information and a location sensitive search request;

b. means for determining a nearest static location that corresponds to the positioning information;

c. means for determining a latitude-longitude value corresponding to the nearest address;

d. means for generating at least one other piece of data in addition to the latitude-longitude value;

e. means for combining the determined latitude-longitude value and the at least one other piece of data to generate the unique key;

f. means for querying a location database for records that satisfy the location sensitive search request;

g. means for generating search results that satisfy the location sensitive search request; and, h. means for transmitting the search results.

39. A method for processing a location sensitive search request from a device for which a unique key, which acts as a reference point for the search, has been assigned already comprising:

a. receiving a unique key and a location sensitive search request;

b. querying a location database, with the unique key as a reference point, for records that satisfy the location sensitive search request;

c. generating search results; and, d. transmitting the search results.

40. A system for processing a location sensitive search request from a device for which a unique key, which acts as a reference point for the search, has been assigned already comprising:

a. means for receiving a unique key and a location sensitive search request b. means for querying a location database, with the unique key as a reference point for records that satisfy the location sensitive search request;

c. means for generating search results; and, d. means for transmitting search results.

41. A method for conducting a location sensitive search comprising:

a. generating a location sensitive search request;

b. submitting the location sensitive search request to a location database server;

c. receiving a search result from the location database server; and, d. displaying the search result.

42. The method of claim 41 wherein the search result is an error message comprising at least one of a list of suggestions for correcting the error or a list of alternative indications of location for which a unique key may be generated.

43. A system for conducting a location sensitive search comprising:

a. means for generating a location sensitive search request;

b. means for submitting the location sensitive search request to a location database server;

c. means for receiving a search result from the location database server; and, d. means for displaying the search result.

44. A method for conducting a location sensitive search from a static location as a point of reference comprising:

a. generating a location sensitive search request;

b. generating an indication of a static location that acts as a reference point for the location sensitive search request;

c. submitting the location sensitive search request and the indication of the static location to a location database server;

d. receiving a search result of the location sensitive search request from the location database server; and, e. displaying the search result.

45. A system for conducting a location sensitive search from a static location as a point of reference comprising:

a. means for generating a location sensitive search request;

b. means for generating an indication of a static location that acts as a reference point for the location sensitive search request;

c. means for submitting the location sensitive search request and the indication of the static location to a location database server;

d. means for receiving a unique key corresponding to at least one of the indication of static location or a search result of the location sensitive search request to the location database server; and, e. means for displaying at least one of the search results or the relative location of the unique key.

46. A method for conducting a location sensitive search from a mobile location of a wireless device as a point of reference comprising:

a. generating a location sensitive search request;

b. generating positioning information of the wireless device;

c. submitting the location sensitive search request and the positioning information of the wireless device to a location database server;

d. receiving a search result; and, e. displaying the search result.

47. The system of claim 46 wherein the positioning information is obtained by employing a positioning technology by which the location of a wireless device can be detected.

48. A system conducting a location sensitive search from a mobile location of a wireless device as a point of reference comprising:

a. means for generating a location sensitive search request;

b. means for generating positioning information of the wireless device;

c. means for submitting the location sensitive search request and the positioning information of the wireless device to a location database server;

d. means for receiving a search result; and, e. means for displaying the search result.

49. A method for creating location sensitive data and transmitting it to a location database server comprising:

a. generating information relating to at least one of an item, a service, an event of interest or an instance of location sensitive information;

b. generating an indication of location for the at least one of an item, a service, an event of interest or an instance of location sensitive information;

c. transmitting the information and the indication of location to a database server; and, d. receiving a response from the location database server.

50. The method of claim 49 wherein the response from the location database server is a confirmation message.

51. The method of claim 50 wherein the response from the location database server is a unique key that corresponds to the information and the indication of location to a database server.

52. The method of claim 50 wherein the response from the location database server is an error message comprising at least one of a list of suggestions for correcting the error or a list of alternative indications of location for the generation of the unique key.

53. A system for creating location sensitive data and transmitting it to a location database server comprising:

a. means for generating information relating to at least one of an item, a service, an event of interest or an instance of location sensitive information;

b. means for generating an indication of location for the information; and, c. means for transmitting the information and the indication of location to a database server.

54. A method for creating location sensitive data that is stored in a location other than a location database server comprising:

a. generating information relating to at least one of an item, a service or an event of interest;

b. generating an indication of location for the information;

c. submitting the indication of location to a location database;

d. receiving a response from the location database server, wherein the response comprises a unique key that corresponds to the submitted indication of location;
e. associating the unique key with location sensitive data; and,
f. creating a data base entry comprising the associated unique key and the location sensitive data.

55. A system for creating location sensitive data that is stored in a location other than a location database server consisting of a:
a. means for generating information relating to an item, a service or an event of interest;
b. means for generating an indication of location for the information;
c. means for submitting the indication of location to a location database;
d. means for receiving a unique key that corresponds to the submitted indication of location;
e. means for associating the unique key with location sensitive data; and,
f. means for creating a data base entry comprising the associated unique key and the location sensitive data.

56. A method for receiving and storing location sensitive data for which a unique key exists comprising:
a. receiving location sensitive data relating to at least one of an item, a service, an event of interest or an instance of location sensitive data
b. receiving an indication of the location of said location sensitive data;
c. parsing the indication of location into a format used by a location database;
d. determining if a valid unique key has been generated from the parsed indication of location;
e. querying the location database for the existence of a unique key for the parsed indication of location;
f. combining the unique key with the location sensitive data; and,
g. creating a database entry comprising the combined unique key and the location sensitive data.

57. The method of claim 56 wherein the database entry is stored in persistent memory.

58. A system for receiving and storing location sensitive data for which a unique key exists comprising:
a. means for receiving location sensitive data relating to at least one of an item, a service, an event of interest or an instance of location sensitive data;
b. means for receiving an indication of the location of said location sensitive data;
c. means for parsing the indication of location into a format used by a location database;
d. means for determining if a valid unique key has been generated from the parsed indication of location;
e. means for querying the location database for the existence of a unique key for the parsed indication of location;
f. means for combining the unique key with the location sensitive data; and,
g. means for generating a database entry for the combined unique key and location sensitive data.

59. The method of claim 58 wherein the database entry is stored in persistent memory.

60. A method for receiving and storing location sensitive data for which a unique key does not exist comprising:
a. receiving location sensitive data relating to at least one of an item, a service, an event of interest or an instance of location sensitive data;
b. receiving an indication of the location of said location sensitive data;
c. parsing the indication of location into a format used by a location database;
d. determining if a unique key may be generated for the parsed indication of location;
e. querying the location database for the existence of a unique key for the parsed indication of location;
f. determining a latitude-longitude value corresponding to the received indication of location;
g. generating at least one other piece of data in addition to the latitude-longitude value;
h. combining the determined latitude-longitude value and the at least one other piece of data to form a unique key;
i. combining the unique key with the location sensitive data; and,
j. creating a database entry for the combined unique key and location sensitive data.

61. An apparatus for searching for location sensitive data comprising:
a. a database having records;
b. at least one record having a unique key, said unique key comprising a unique identifier of location and one other piece of data;
c. a database query engine which queries the database; and,
d. an output generator that transmits a response corresponding to the search query.

62. An apparatus for generating a unique key comprising:
a. a database having records;
b. at least one record having a unique key, said unique key comprising a unique identifier of location and one other piece of data;
c. a database query engine that queries the database; and,
d. an address translator engine that receives a request for an instance of the unique key, translates the indication of location and returns the unique key.

63. A computer program product, comprising:
a memory having computer-readable code embodied therein for generating a unique key comprising:
a. code means for receiving an indication of location;
b. code means for determining a latitude-longitude value corresponding to the received indication of location;
c. code means for generating at least one other piece of data in addition to the latitude-longitude value; and,
d. code means for combining the determined latitude-longitude value and the at least one other piece of data to form a unique key.

64. A computer program product, comprising:
a memory having computer-readable code embodied therein for conducting a location sensitive search comprising:
a. code means for generating a location sensitive search request;
b. code means for submitting the location sensitive search request to a location database server;
c. code means for receiving a search result from the location database server; and,
d. code means for displaying the search result.

* * * * *